Dec. 7, 1926.
J. MORGAN
1,609,762
MEANS FOR EXTINGUISHING FIRES
Filed June 23, 1925     4 Sheets-Sheet 1
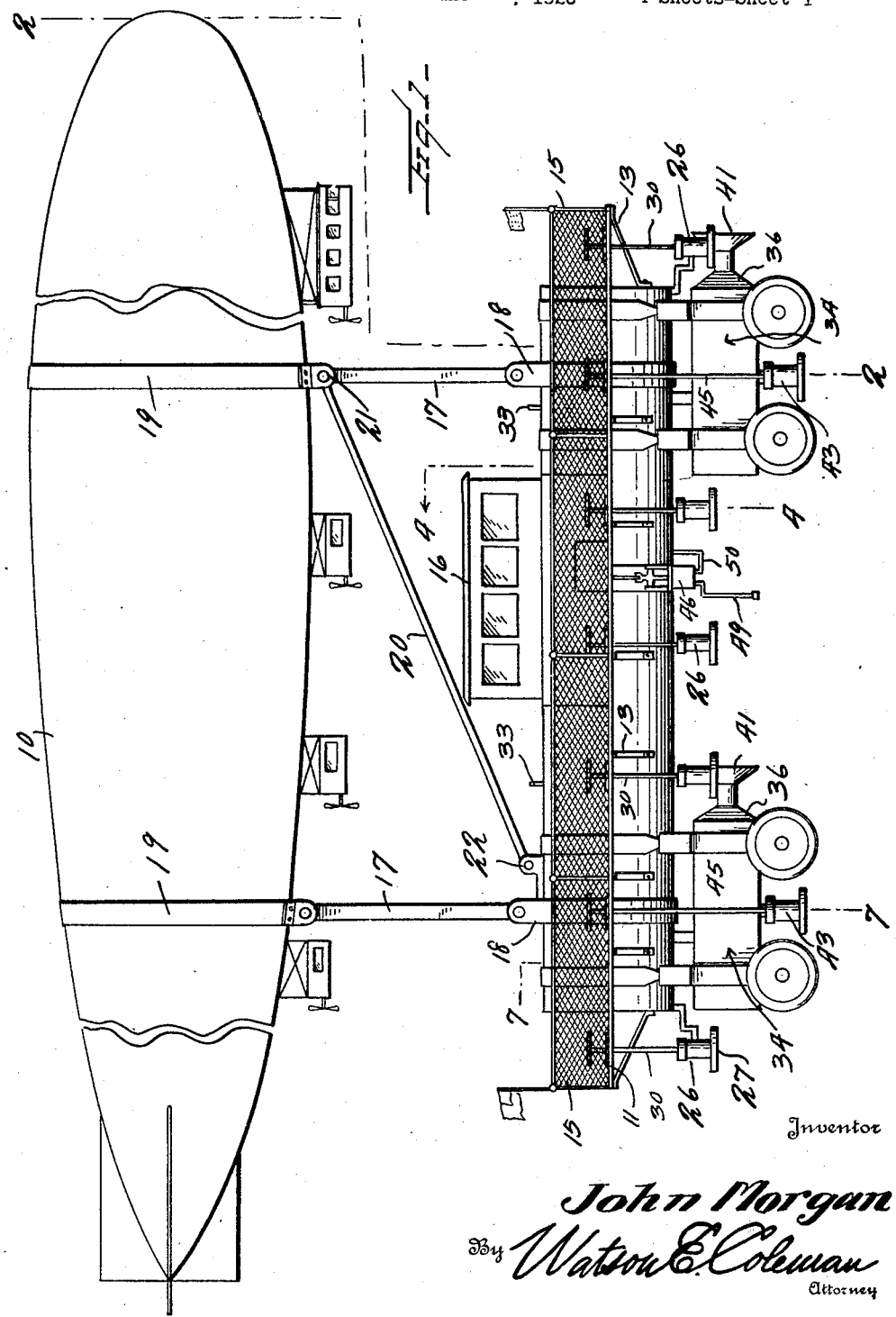
Inventor
John Morgan
By Watson E. Coleman
Attorney

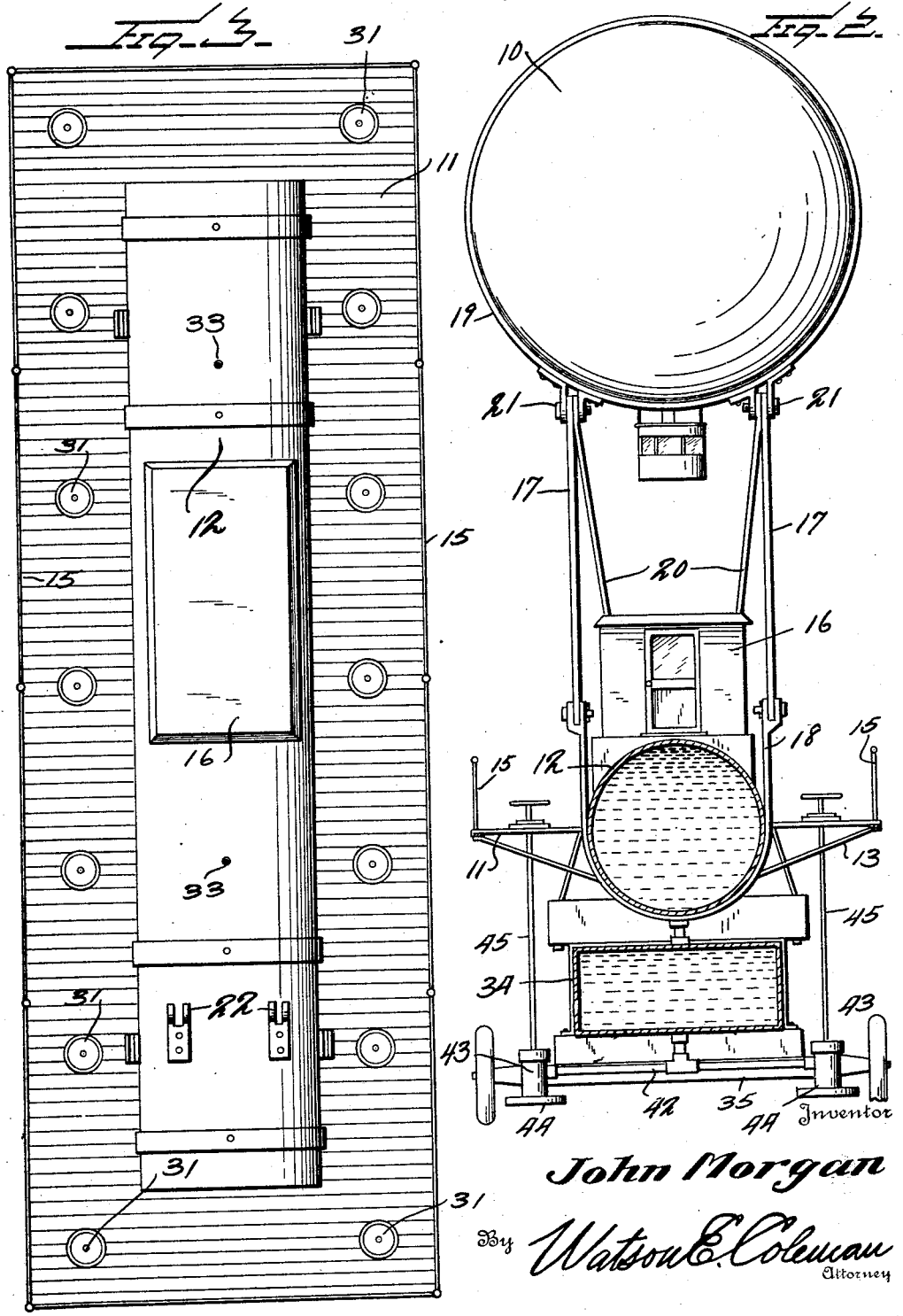

Dec. 7, 1926.
J. MORGAN
MEANS FOR EXTINGUISHING FIRES
Filed June 23, 1925     4 Sheets—Sheet 3
1,609,762
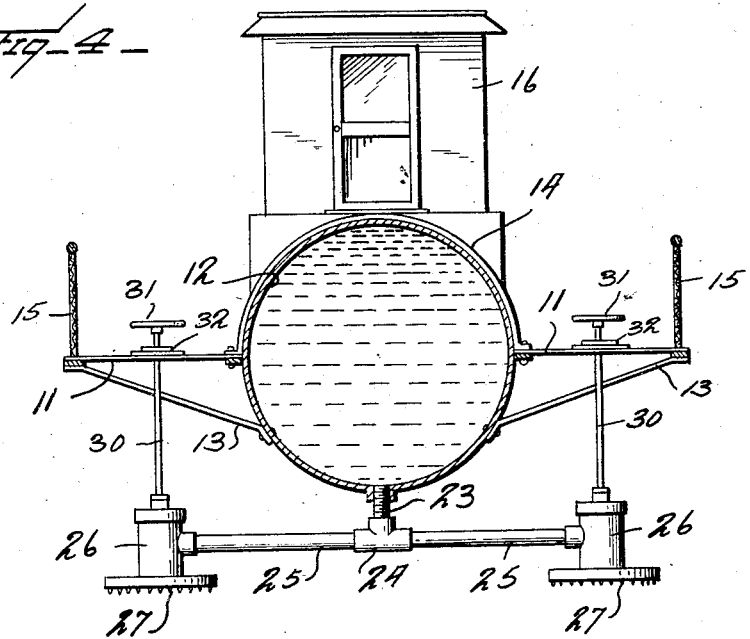
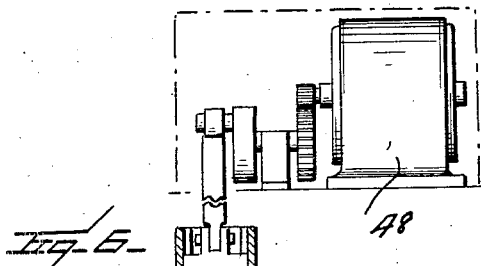
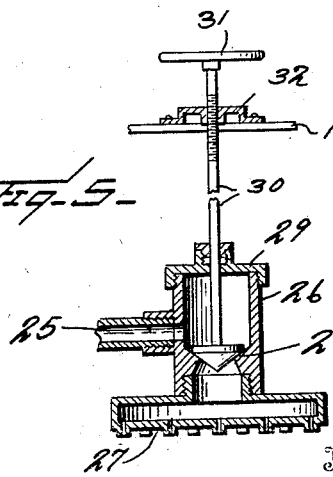
Inventor
John Morgan
By Watson E. Coleman
Attorney Dec. 7, 1926.
J. MORGAN
1,609,762
MEANS FOR EXTINGUISHING FIRES
Filed June 23, 1925 4 Sheets-Sheet 4
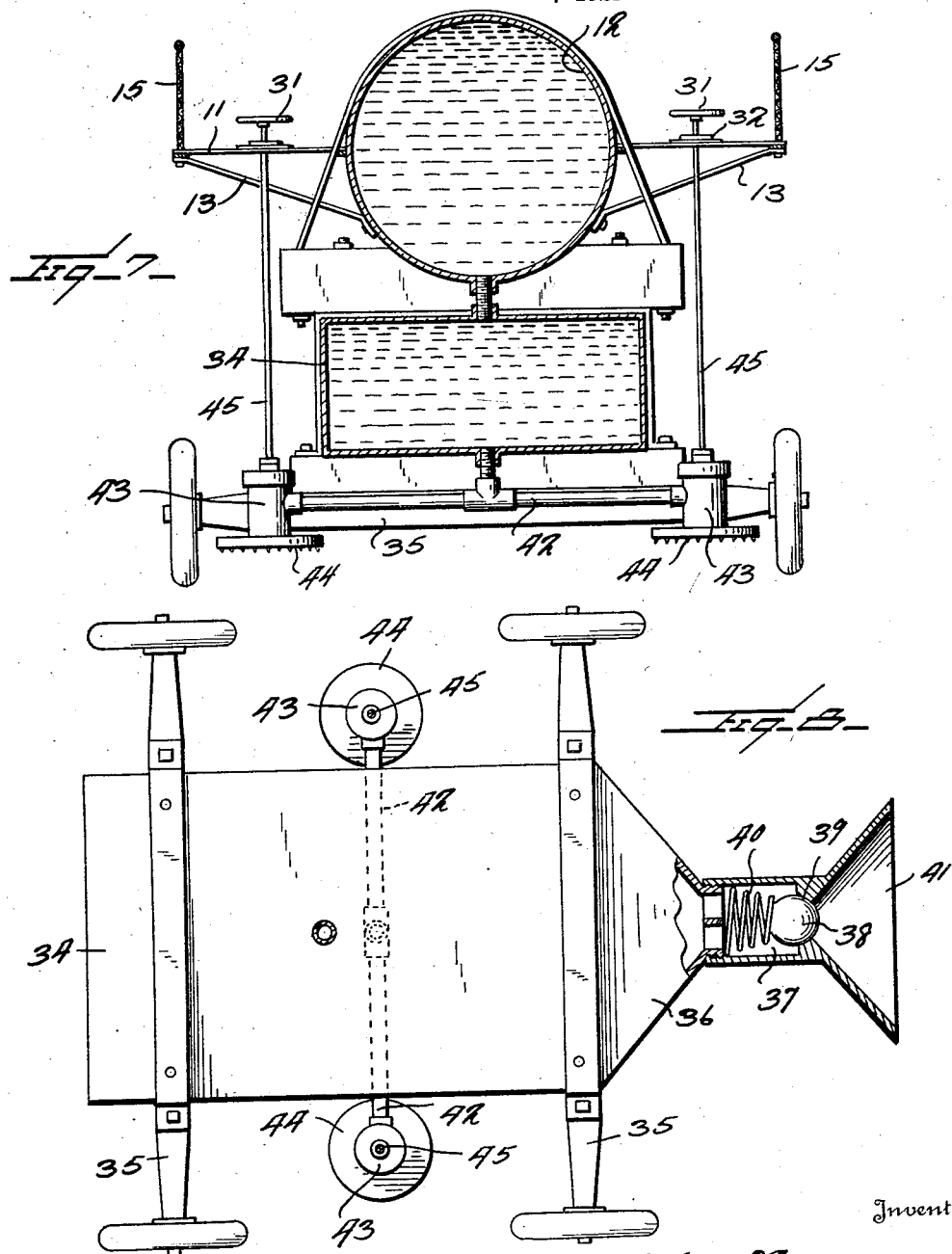

Patented Dec. 7, 1926.

1,609,762

UNITED STATES PATENT OFFICE.

JOHN MORGAN, OF SCRANTON, PENNSYLVANIA.

MEANS FOR EXTINGUISHING FIRES.

Application filed June 23, 1925. Serial No. 39,118.

This invention relates to means for extinguishing fires, and the general object of the invention is to provide in combination with a dirigible balloon a water tank supported by the balloon and transported thereby, this water tank having means whereby it may be filled either through a pump operated by a motor or by dipping into a body of water and allowing the tanks to fill as the machine travels forward.

A further object is to provide improved means for supporting the tank upon the dirigible, and to provide a tank and a plurality of spraying pipes connected to the tank and provided with a plurality of valves whereby the outlet from the spraying pipes may be controlled, the tank being surrounded by a deck or platform providing means whereby the operators may have access to the various valves to control the discharge of water from the tank.

A still further object is to provide trucks for supporting the tank on the ground or running along the bottom of a stream or other body of water, which trucks are provided with tanks having means whereby they may be filled as the machine moves through the body of water.

Other objects have to do with the details of construction and arrangement of parts as will appear more fully hereinafter.

My invention is illustrated in the accompanying drawings, wherein:—

Figure 1 is a side elevation of my fire extinguishing apparatus;

Figure 2 is a section on the line 2—2 of Figure 1;

Figure 3 is a top plan view of the tank and platform;

Figure 4 is a section on the line 4—4 of Figure 1;

Figure 5 is a vertical sectional view of one of the sprayer heads showing the valve therein and the means for actuating the valve;

Figure 6 is a vertical sectional view of the pump;

Figure 7 is a section on the line 7—7 of Figure 1;

Figure 8 is a top plan view of the auxiliary or truck tank showing the filling opening therefor;

Referring to these drawings, 10 designates a dirigible balloon of any suitable construction, and supported from this dirigible balloon is a tank supporting structure which, as illustrated, consists of a rectangular platform 11 defining a central space which is equal in length to the tank 12 so that the platform in a sense surrounds the tank. The tank is supported from the platform by braces 13 which extend down from this platform, as shown in Figure 4, and are riveted, bolted or otherwise attached or engaged with the water tank. Upwardly curved or bowed braces 14 are also attached to this platform 11 and extend over the water tank 12 which, as illustrated, is circular in cross section.

The platform 11 is defined by an upstanding wall or gunwale 15, and mounted upon the top of the tank in any suitable manner is a cabin 16 wherein the operators may live. The tank is supported from the dirigible by downwardly extending links or cables 17, which at their lower ends are connected to straps 18 which pass around the tank. The upper ends of these links 17 are connected to straps 19 which pass around the dirigible itself or are connected thereto in any suitable manner, and in order to prevent the tank from swinging with reference to the dirigible bracing struts 20 may be provided which, as illustrated, are fastened at their upper ends to the bolt 21 which connects the forward balloon-embracing strip 19 with the link or cable 17. This brace 20 extends downward and rearward and is riveted, bolted or otherwise attached, as at 22, to the tank itself.

Extending downward from the bottom of the water tank are a plurality of pipes 23 having T's 24 at their lower ends, and through these T's extend the cross pipes 25 which connect with vertical valve chambers 26 disposed equi-distantly along the length of the platform. The lower ends of these vertical valve chambers 26 are connected to sprayer heads 27, the lower ends of which are formed with a plurality of outlets so as to discharge a spray downward, and each valve chamber 26 is formed with a seat 28.

Extending upward through the cap 29 which forms the upper end of each valve chamber is a valve operating stem 30 having a wheel 31 at its upper end whereby it may be manipulated. Mounted upon the deck or platform is a supporting member 32 through which the stem passes and which means is screw-threaded for the engagement of the stem so that as the stem is rotated in one direction the valve will be lifted, and when the stem is rotated in the opposite direction the valve will be closed. Obviously the upper end of the cylindrical valve chamber 26 may be formed with screw-threads for the valve. These valves may be of any suitable or ordinary construction, the object being, of course, to control the flow through the sprayer heads. The tank is provided at one or more points with air inlet openings 33 so that the water may pass out readily from the tank when the valves are opened.

The opposite ends of the tank are supported by means of trucks, designated generally 34 and carrying supporting wheels. Each of these trucks consists of a water tank proper and a pair of axles 35 attached to the said water tank 34 at each end of the truck formed thereby. The forward end of each truck tank is formed with a forwardly converging portion 36 having a central opening and a valve chamber 37 leading therefrom and in which is a ball valve 38 which is urged against a seat 39 by means of a spring 40. Forward of this seat 39 an inlet for the tank 34 is formed with a flaring mouth 41, and it will be obvious that as this tank 34 is forced through the water, the water will force the valve open and water will pass into the corresponding tank 34. Each tank 34 may be provided with a pipe or pipes leading up into the main water tank so as the truck water tanks 34 are moved through the water, water will pass into the inlets thereof and be forced up through these inlets into the main water tank or the device may be simply lowered into a body of water to a depth equal to that of the main water tank itself and the water will flow in through these inlets 37, opening the ball valves 38, and thus fill the main water tank and the water tanks on the trucks.

As shown in Figures 7 and 8, each tank 34 is provided with a plurality of transversely extending discharge pipes 42 opening into valve chambers 43 connected at their lower ends to sprayer heads 44. The valves within these chambers 43 are precisely like the valves heretofore described and are operated by means of valve rods 45 extending up through the deck 11 and having hand wheels whereby the valve rods may be rotated to raise or lower the valves and thus close or open the sprayer heads.

In addition to this construction, I may also provide, as illustrated in Figure 6, a pump 46 which is mounted below the main water tank and between the trucks and which is provided with a piston 47 operated by means of a motor 48, this pump cylinder 46 having an induction pipe 49 and a discharge pipe 50 which leads into the main tank. Thus this apparatus may descend onto a sheet of water with the pipe 49 submerged and then the pump may be started up so as to pump water up into the tank.

This apparatus is particularly designed for putting out forest fires, though not limited to this use. It is obvious that a structure of this kind will be particularly convenient and advantageous, inasmuch as a large quantity of water may be carried to the immediate neighborhood of the fire and the fire drenched by opening the spraying valves. The discharge of water may be localized, of course, by only opening those valves which are immediately above the fire or may be spread over a relatively large surface by opening more of the valves. Of course, the water my be impregnated with suitable salts which will develop gases, aiding in smothering the fire, and thus a relatively small amount of water will do a large amount of work.

I claim:—

1. The combination with an elongated balloon, of a tank disposed below and extending longitudinally of the balloon and operatively supported therefrom, a deck carried by the tank and extending around the same, a plurality of spray nozzles disposed below the deck and operatively connected to the tank, valves operable from the deck controlling the discharge through the spray nozzles, trucks disposed below the ends of the tank, each truck including a tank, spray nozzles operatively connected to said truck tanks and having valves whereby discharge through these tanks may be controlled, each truck tank having an inlet opening, a forwardly flaring nozzle and a check valve permitting the induction of water through said nozzle into the interior of the truck tank but preventing the outward discharge of water therefrom, each truck tank being operatively connected to the main tank whereby water may pass upward into the main tank.

2. The combination with a water tank and a balloon for suspending the tank in the air, of means for filling the tank with water including a funnel-shaped inlet member opening toward the forward end of the apparatus and having a check valve therein opening upon pressure of water from the outside, and a spring for holding said valve normally closed.

In testimony whereof I hereunto affix my signature.

JOHN MORGAN.